United States Patent [19]
Kang

[11] Patent Number: 5,907,567
[45] Date of Patent: May 25, 1999

[54] APPARATUS FOR DETECTING REPRODUCING SIGNAL IN RECORDING MEDIA AND METHOD THEREOF

[75] Inventor: Ki Won Kang, Seoul, Rep. of Korea

[73] Assignee: LG Electronics Inc., Seoul, Rep. of Korea

[21] Appl. No.: 08/768,924

[22] Filed: Dec. 18, 1996

[30] Foreign Application Priority Data

Dec. 18, 1995 [KR] Rep. of Korea .................. 51434 1995

[51] Int. Cl.[6] ...................................................... H04L 1/08
[52] U.S. Cl. ............................. 371/69.1; 371/43; 371/45; 375/262
[58] Field of Search ........................... 371/69.1, 43, 67.1, 371/48, 45; 375/262

[56] References Cited

U.S. PATENT DOCUMENTS

| | | | |
|---|---|---|---|
| 4,903,005 | 2/1990 | Sakashita et al. | 340/146.2 |
| 5,341,387 | 8/1994 | Nguyen | 371/45 |
| 5,471,502 | 11/1995 | Ishizeki | 375/376 |

*Primary Examiner*—Phung M. Chung

[57] ABSTRACT

In a disk storage system using an RLL coding and an NRZ1 recording method and applying a (1+D) PR channel, a viterbi detector of the present invention includes an inverter for multiplying a present input by "−1"; a delay for delaying the output of the inverter for a predetermined time period; and a comparator for comparing the present input with a previous input supplied via the delay and outputting a specific value which varies its sign according to the result.

4 Claims, 6 Drawing Sheets

FIG.1
prior art
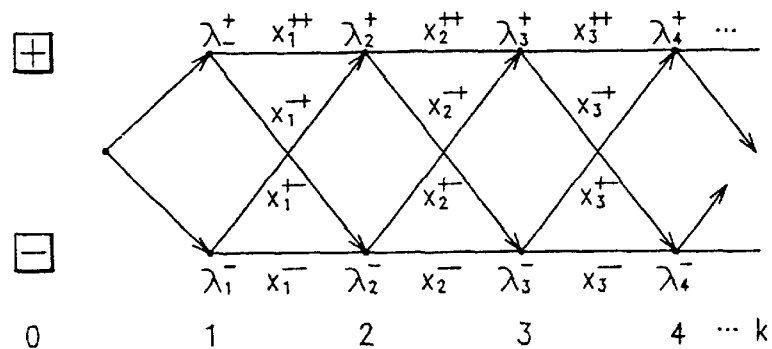
FIG.2
prior art
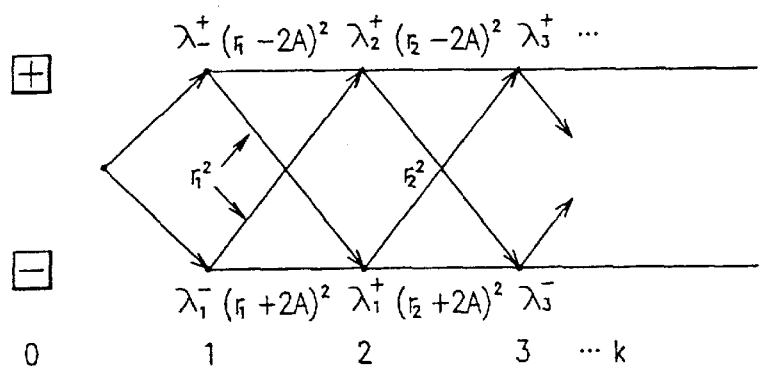
| FIG. 3A<br>prior art | FIG. 3B<br>prior art | FIG. 3C<br>prior art | FIG. 3D<br>prior art |
|---|---|---|---|
| 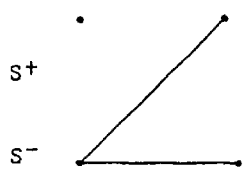 | 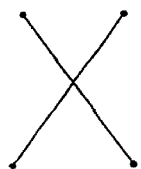 | 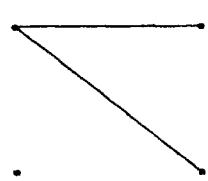 | 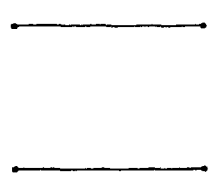 |
| Negative merge<br>(m−) | Cross over<br>(mc) | Positive merge<br>(m+) | No merge<br>(m0) |

| Δk | Δk+1 | path update |
|---|---|---|
| $< -r_k - A$ | $r_k + A$ | $m^-$ |
| $\in [-r_k - A, -r_k + A]$ | $\Delta k^-$ | $m^c$ |
| $> -r_k + A$ | $r_k - A$ | $m^+$ |

$A = A^{opt}$ $A = 0$ $A = A^{opt}$ $A = 0$

APPARATUS FOR DETECTING REPRODUCING SIGNAL IN RECORDING MEDIA AND METHOD THEREOF

BACKGROUND OF THE INVENTION

1. Field of the Invention

The present invention relates to a viterbi detector for use in a disk storage system which uses an RLL(Run-Length Limited) coding and an NRZ1 (Non-Return to Zero 1) recording method and applies a (1+D) PR channel.

2. Discussion of Related Art

Generally, in a lower density data storage system, there scarcely occurs an Inter-Symbol Interference (ISI) and thus there is no need to equalize the waveform when detecting an original signal from a decoder.

However, with the development of high density storage systems which store more information in a limited area, we cannot overlook inter-symbol interference. Many techniques have been proposed to solve this problem and one of these techniques is a Partial Response Maximum Likelihood (PRML) using a viterbi detector.

Ferguson has proposed a method for simply embodying the viterbi detector in the case that the inter-symbol interference occurs in the (1±D) channel, and description will be made herein on the case of the (1+D).

FIG. 1 is a trellis diagram showing a detector having two states. It shows the possibility of passing a branch for $X_k^{++}$, $X_k^{+-}$, $X_k^{-+}$ and the input $\gamma_k$ of the viterbi detector, and this is referred to as a branch matrix. In the figure, $++, +-, -+, --$ show that from what state to what state the branch is changed. In addition, $\lambda_k^+$ or $\lambda_k^-$ is the value obtained by adding all branch matrixes while being passed to the node, and is referred to as a path matrix.

In a general viterbi detector, the path matrix is determined as follows:

$$\lambda_{k+1}^- = \min(\lambda_k^- + x_k^{--}, \lambda_k^+ + x_k^{+-})$$
$$\lambda_{k+1}^+ = \min(\lambda_k^- + X_k^{-+}, \lambda_k^+ + X_k^{++}) \quad \text{equation (1)}$$

If $\Delta_k \cong \lambda_k^- - \lambda_k^+$, $Q_{k+1}^- \cong \lambda_{k+1}^- - \lambda_k^+$, $Q_{k+1}^+ \cong \lambda_{k+1}^+ \cong \lambda_{k+1}^- - \lambda_k$ are applied to the equation (1), $$Q_{k+1}^- = \min(\Delta_k + X_k^{--}, X_k^{+-})$$
$$Q_{k+1}^+ = \min(\Delta_k + X_k^{-+}, X_k^{++}) \quad \text{equation (2)}$$
$$Q_{k+1}^- - Q_{k+1}^+ = (\lambda_{k+1} - \lambda_k^-) - (\lambda_{k+1} - \lambda_k^+) = \Delta_{k+1}$$

That is, in the trellis diagram, two branches are met at one node. In this algorithm, the previous path matrix is added to each of two branch matrixes and then the path with the smaller value is selected as a new path.

FIG. 2 is a trellis diagram in the case of (1+D), and the branch matrix values are defined as follows:

$$X_k^{++} = (\gamma_k - 2A)^2, X_k^{+-} = X_k^{-+} = \gamma_k^2, X_k^{--} = (\gamma_k - 2A)^2.$$

Thus, the above equation (2) becomes $$Q_{k+1}^- = \min(\Delta_k + (\gamma_k - 2A)^2, \gamma_k^2)$$

$$Q_{k+1}^+ = \min(\Delta_k + \gamma_k^2, (\gamma_k - 2A)^2) \quad \text{equation (3)}.$$

FIGS. 3A to 3D show all possible cases of FIG. 1, and each case can be analyzed with the above equation (3) and FIG. 2 as follows.

Firstly, a negative merging as shown in FIG. 3A can be analyzed as follows:

$(S^- \to S^-): \Delta_k + (\gamma_k + 2A)^2 < \gamma_k^2 \to \Delta_k/4A < -\gamma_k - A$ $(S^- \to S^+): \Delta_k + \gamma_k^2 < (\gamma_k + 2A)^2 \to \Delta_k/4A < -\gamma_k + A$ $\therefore \Delta_k/4A < -\gamma_k - A \quad (\because A > 0)$ $\Delta_{k+1}/4A = \{\Delta_k + (\gamma_k + 2A)^2 - (\Delta_k + \gamma_k^2)\}/4A = \gamma_k + A \quad \text{equation (4)}$ Secondly, a cross over as shown in FIG. 3B can be analyzed as follows:

$(S^- \to S^-): \Delta_k + (\gamma_k + 2A)^2 > \gamma_k^2 \to \Delta_k/4A > -\gamma_k - A$ $(S^- \to S^+): \Delta_k + \gamma_k^2 < (\gamma_k + 2A)^2 \to \Delta_k/4A < -\gamma_k + A$ $\therefore -\gamma_k - A < \Delta_k/4A < -\gamma_k + A$ $\Delta_{k+1}/4A = \{\gamma_k^2 - (\Delta_k + \gamma_k^2)\}/4A = -\Delta_k/4A \quad \text{equation (5)}$ Thirdly, a positive merging as shown in FIG. 3C can be analyzed as follows:

$(S^- \to S^-): \Delta_k + (\gamma_k + 2A)^2 > \gamma_k^2 \to \Delta_k/4A > -\gamma_k - A$ $(S^+ \to S^+): \Delta_k + \gamma_k^2 > (\gamma_k + 2A)^2 \to \Delta_k/4A > -\gamma_k + A$ $\therefore -\gamma_k/4A > -\gamma_k + A$ $\Delta_{k+1}/4A = \gamma_k - A \quad \text{equation (6)}$ Fourthly, no merging as shown in FIG. 3D can be analyzed as follows:

$(S^- \to S^-): \Delta_k + 4A < -\gamma_k - A$ $(S^+ \to S^+): \Delta_k/4A > -\gamma_k + A$ There is no satisfied region . . . equation (7)

If defining that $\Delta_k' = \Delta_k/4A$, the results as shown in FIG. 4 can be obtained and FIG. 5 shows a general viterbi detector embodying the results.

However, in a conventional viterbi detector as described above, the decoded value can be obtained after lapse of a predetermined time, the performance depends on the value A and it is difficult to detect the value A.

SUMMARY OF THE INVENTION

Accordingly, the present invention is directed to a viterbi detector that substantially obviates one or more of the problems due to limitations and disadvantages of the related art.

An object of the present invention is to provide a viterbi detector for use in a storage system, which can embody a simple configuration by using the characteristics of RLL coding and (1+D) channel and prevent the deterioration of performance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in a disk storage system using an RLL coding and an NRZ1 recording method and applying a (1+D) PR channel, a viterbi detector of the present invention includes an inverter for multiplying a present input by "−1"; a delay for delaying the output of the inverter for a predetermined time period; and a comparator for comparing the present input with a previous input supplied via the delay and outputting a specific value which varies its sign according to the result.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 is a trellis diagram showing a general viterbi detector having two states;

FIG. 2 is a trellis diagram in the case of (1+D);

FIGS. 3A to 3D are analyzing diagrams showing the possible cases that may occur in FIG. 1 with FIG. 3A a negative merging diagram, FIG. 3B a cross over diagram, FIG. 3C a positive merging diagram and FIG. 3D a no merging diagram;

FIG. 7A is generated by NRZ1.

DETAILED DESCRIPTION OF PREFERRED EMBODIMENT

Reference will now be made in detail to the preferred embodiments of the present invention, examples of which are illustrated in the accompanying drawings.

Figure 6:
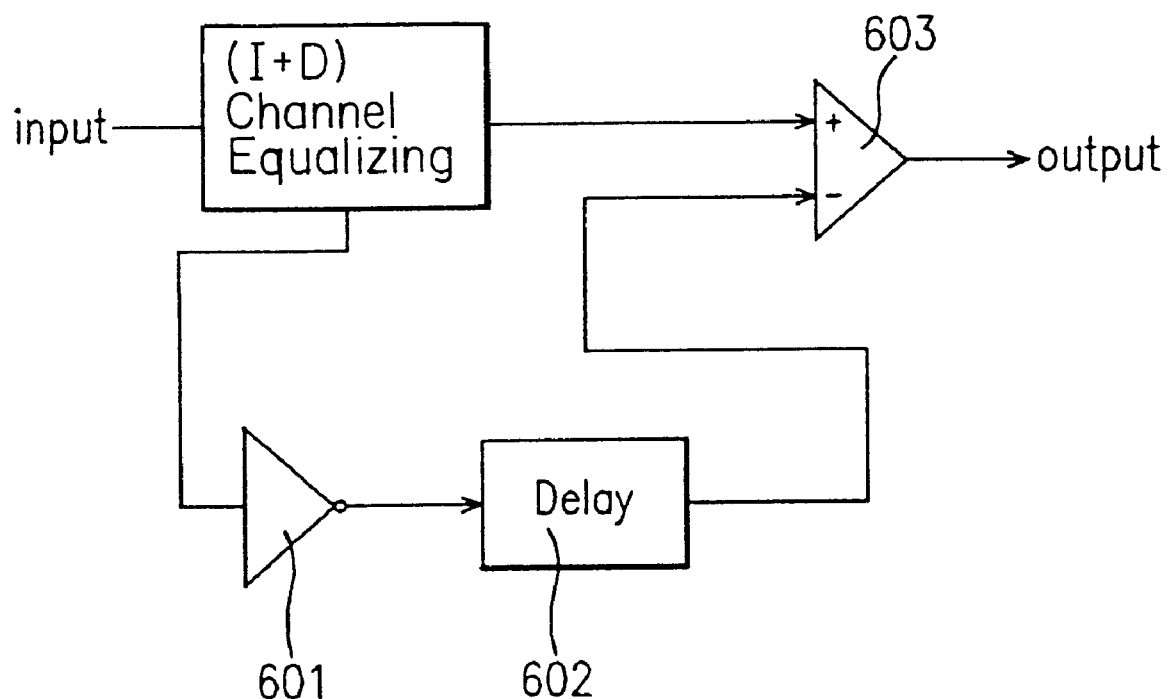
FIG. 6 is a block diagram showing a viterbi detector according to the present invention.

FIG. 6 is a diagram showing a preferred embodiment of a viterbi detector according to the present invention. The viterbi detector is comprised of an inverter 601 for multiplying a present input after (1+D) channel equalizing by "−1", a delay 602 for delaying the output of the inverter 601 for a predetermined time period, and a comparator 603 for comparing the present input with the previous input supplied via the delay 602. If the previous input is smaller than the present input, the comparator 603 outputs "1" and if the previous input is greater than the present input, the comparator 603 outputs "−1".

The operation and effect of this viterbi detector will be described in detail with reference to FIGS. 7 to 9.

In a disk storage system using the RLL coding and NRZ1 recording method and applying the (1+D)PR channel, in order to record data at a disk by an NRZ1 method and approximate the optical pick-up characterisitc of the recorded data to the (1+D) channel characteristic, the previous input supplied to an inverted input terminal of the comparator 603 via the inverter 601 and the delay 602 is compared with the present input supplied to a non-inverted input terminal of the comparator 603. For example, if the value obtained by multiplying the previous input by "−1" is smaller than the present input, the comparator 603 outputs the logic value "1", and if not, outputs the logic value "−1".

That is, the comparator 603 compares the value obtained by multiplying the previous input by a specific value with the present input and then outputs a specific value which varies its sign according to the result.

Figures 7A, 7B, 7C, 7D:
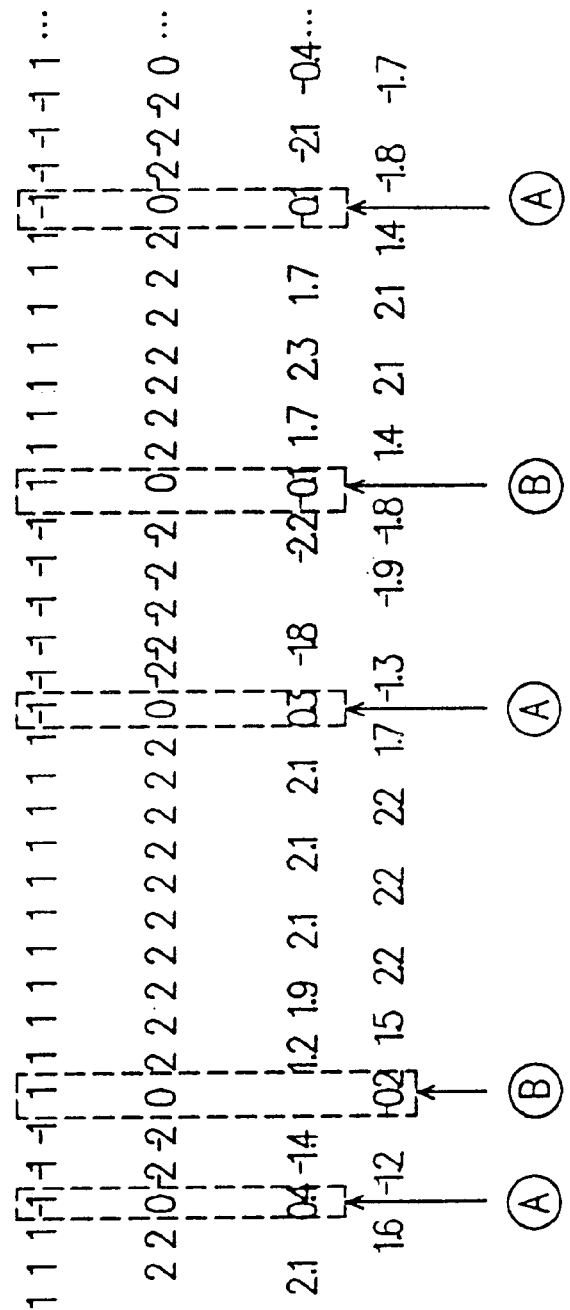
FIG. 7A shows the result of RLL(2,10) code.
FIG. 7B shows the result when
FIG. 7C shows the result when FIG. 7B passes through the (1+D) channel.
FIG. 7D shows the transformed result of FIG. 7C.

FIG. 7A shows the result of RLL(2, 10) code, FIG. 7B shows the result as generated by NRZ1 and FIG. 7C shows the output when the result of FIG. 7B passes through the (1+D) channel.

In other words, since "0" point is recognized only in the signal inversion period when (1+D) equalizing the signal recorded by NRZI method (see FIG. 7C), it is suspected that the "0", point is detected to invert the signal. However, it is impossible to actually detect the "0" point because the (1+D) equalized signal is somewhat unstable (see FIG. 7D). If the source signal is RLL-coded, at least two or more "0"0 points should be included between "1" and "1". Therefore, if the (1+D) equalized value is compared with its output value delayed for a predetermined time period, the positive (+) signal and the negative (−) signal are inverted at the point where the (1+D) equalized value is recognized as the "0" point.

In a disk storage system, the method for recording data at the disk is NRZ1, and the optical pick up characteristic can be approximated to the (1+D) channel characteristic. Therefore, the object herein is to provide means for detecting the bit line of FIG. 7B from the bit line of FIG. 7C.

Figures 4, 5:
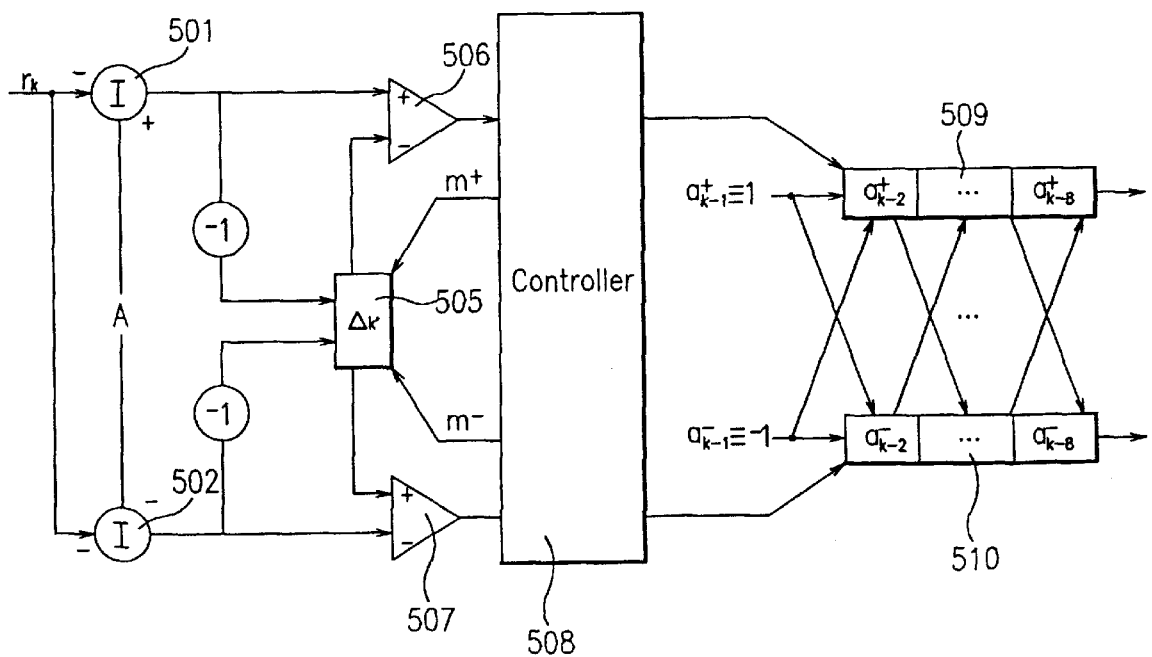
FIG. 4 is a table showing the result of $\Delta_k'=\Delta_k/4A$.
FIG. 5 is a block diagram showing a general viterbi detector.

The conventional Ferguson viterbi detector is the detector which inputs the bit line of FIG. 7C and then outputs the bit line of FIG. 7B. As shown in FIG. 4, the value "A" is a threshold value of the viterbi detector and is a measure of determining the performance. Thus, if this value is set to a proper value, this enables a highest performance.

In the case of FIG. 7, it is most preferable that "A" has the value "1".

However, since the optical pick up is not exactly equal to the (1+D) channel, FIG. 7D which is slightly different from the value of FIG. 7C is input to the detector. In this case, the value "A" must be changed for a better performance. As described above, the value "A" must be changed according to the state of the channel for the best performance.

In a general viterbi detector, the value "A" is important and if the value "A" is too small or too great a high performance cannot be expected. But, in case of FIG. 7D, high performance can be always maintained when the value "A" becomes smaller than the value, while the performance is deteriorated when the value "A" becomes greater than the value.

Analysis will be made on the result obtained by substituting A by the smallest value "0".

If the value A is "0", the equations (4), (5) and (6) will be as follows:

negative merge: $\Delta_k'<-\gamma_k$ $$\Delta_{k+1}'=\gamma_k \quad \text{equation (8)}$$

cross over; $-\gamma_k < \Delta_k' < -\gamma_k$ $$\Delta_{k+1}'=-\Delta_k' \quad \text{equation (9)}$$

positive merge: $\Delta_k' > -\gamma_k$ $$\Delta_{k+1}'=-\gamma_k \quad \text{equation (10)}$$

That is, if the value A becomes smaller, the cross over region is reduced, while the negative or positive merge region is increased. If A=0, there exits no cross over.

Figure 8A:
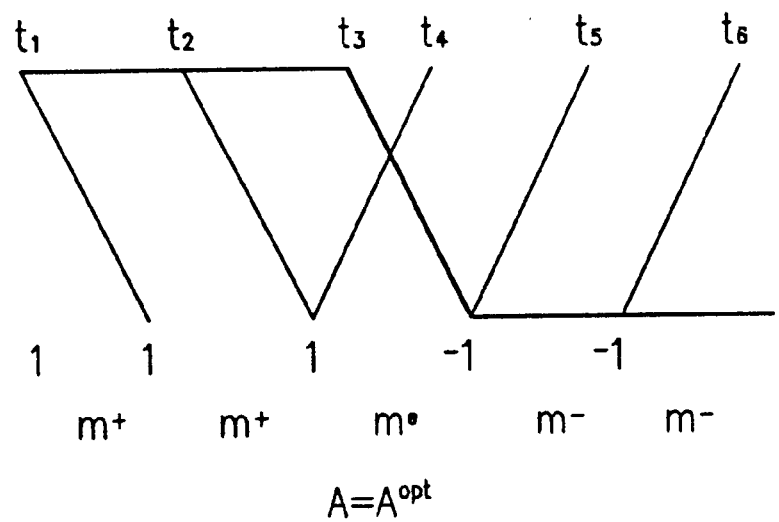
FIGS. 8A to 8B show the operations of the Ferguson viterbi detector in the case of FIG. 7A.

FIG. 8A shows the operation of the Ferguson viterbi detector in the case of FIG. 7A. In this case, the operation of the detector of the present invention can be explained as follows.

$t_1$: $\gamma_1=0$, $\Delta_2=0$ (initialize)

Figure 8B:
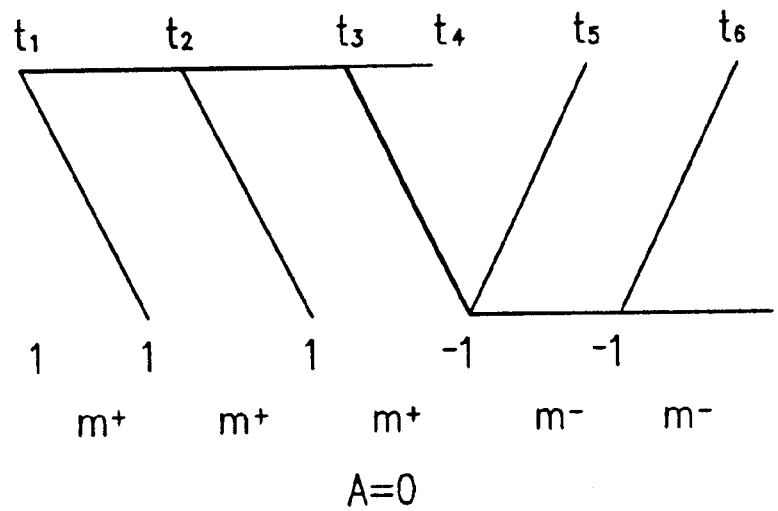

$t_2$: $\gamma_2 \cong 2 \rightarrow \Delta_2 > -\gamma_1 \rightarrow m^+ \rightarrow \Delta_3 \cong \gamma_2 (\cong 2)$ $t_3$: $\gamma_3 \cong 2 \rightarrow \Delta_3 > -\gamma_3 \rightarrow m^+ \rightarrow \Delta_4 \cong \gamma_3 (\cong 2)$ $t_4$: $\gamma_4 \cong 0 \rightarrow \Delta_4 > -\gamma_4 \rightarrow m^+ \rightarrow \Delta_5 \cong \gamma_4 (\cong 0)$ $t_5$: $\gamma_5 \cong 2 \rightarrow \Delta_6 > -\gamma_5 \rightarrow m^- \rightarrow \Delta_6 \cong \gamma_5 (\cong -2)$ $t_6$: $\gamma_6 \cong 2 \rightarrow \Delta_6 > -\gamma_6 \rightarrow m^- \rightarrow \Delta_7 \cong \gamma_6 (\cong -2)$ Thus, the detector of the present invention operates as shown in FIG. 8B, and the FIGS. 8A and 8B obtain an identical result.

Figure 9A:
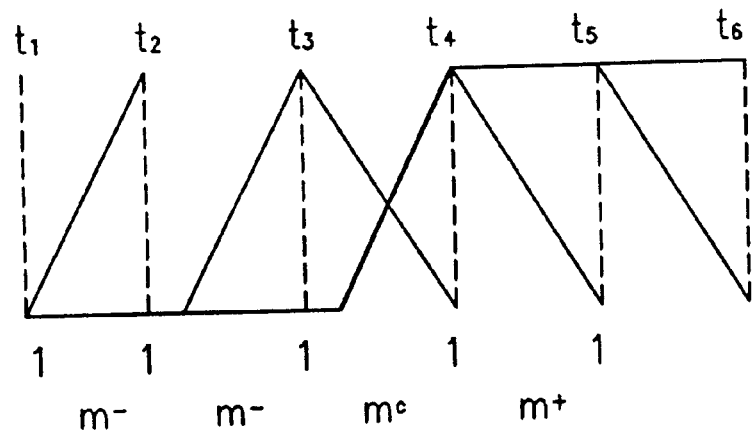
FIGS. 9A to 9B show the operations of the Ferguson viterbi detector in the case of FIG. 7B.
Figure 9B:
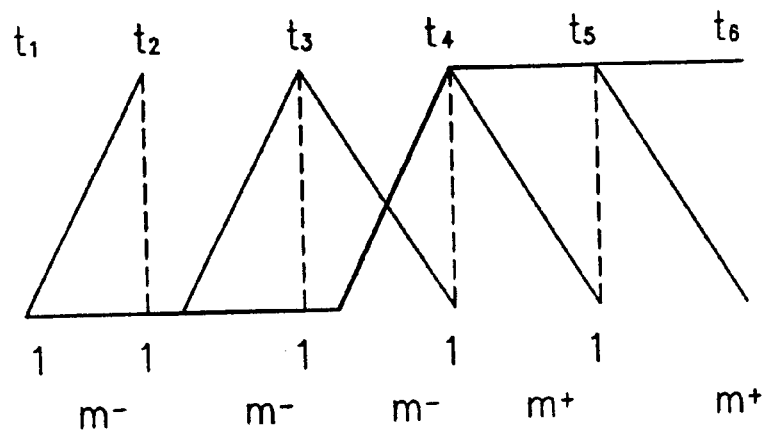

FIGS. 9A and 9B show the operation of the detector in the case of FIG. 7B, and even in various other cases, it is possible to obtain an identical result.

As described above, the present invention can prevent the deterioration of the performance as well as can simply embody the circuit by recording data at the disk by an NRZ1 method and approximating the optical pick up characteristics to the (1+D) channel characteristics.

It will be apparent to those skilled in the art that various modifications and variations can be made in the viterbi detector of the present invention without departing from the spirit or scope of the invention. Thus, it is intended that the present invention cover the modifications and variations of this invention provided they come within the scope of the appended claims and their equivalents.

What is claimed is:

1. A viterbi detector, comprising:

an inverter for multiplying an input by "−1" and outputting an inverted input;

a delay for delaying said inverted input for a predetermined period; and a comparator for comparing said delayed inverted input with, said input outputting a first value when said input is greater than said delayed inverted input, and outputting a second value, opposite said first value, when said delayed inverted input is greater than said input.

2. A viterbi detecting method comprising the steps of:

inverting an input;

delaying said inverted input by a predetermined period;

comparing said delayed inverted input with said input;

outputting a first value when said input is greater than said delayed inverted input; and outputting a second value, opposite said first value, when said delayed inverted input is greater than said input.

3. An apparatus for detecting a reproducing signal in recording media using an RLL coding and an NRZI recording mode, comprising:

sampling means for sampling a signal reproduced from the recording media at a predetermined period;

generating means for generating a sum signal by summing at least output from said sampling means;

a delay for delaying output of said generating means by a predetermined period; and a comparator for comparing said output of said generating means with output of said delay, outputting a first value when said output of said generating means is greater than said output of said delay, and outputting a second value, opposite said first value, when said output of said delay is greater than said output of said generating means.

4. A method for detecting a reproducing signal in recording media using an RLL coding and an NRZI recording mode, comprising the steps of:

sampling a signal reproduced from the recording media at a predetermined period;

generating a sum signal by summing at least output from said sampling step;

delaying output of said generating step by a predetermined period;

comparing said output of said generating step with output of said delaying step;

outputting a first value when said output of said generating step is greater than said output of said delaying step; and outputting a second value, opposite said first value, when said output of said delaying step is greater than said output of said generating step.

* * * * *